US012163646B2

(12) United States Patent
Zheng

(10) Patent No.: US 12,163,646 B2
(45) Date of Patent: Dec. 10, 2024

(54) SIDE-EMITTING DOWNLIGHT WITH INTEGRATED LIGHT BAR

(71) Applicant: JOININ GLOBAL PTE. LTD., Singapore (SG)

(72) Inventor: Hongbing Zheng, Singapore (SG)

(73) Assignee: JOININ GLOBAL PTE. LTD., Singapore (SG)

( * ) Notice: Subject to any disclaimer, the term of this patent is extended or adjusted under 35 U.S.C. 154(b) by 0 days.

(21) Appl. No.: 18/414,965

(22) Filed: Jan. 17, 2024

(65) Prior Publication Data

US 2024/0263766 A1 Aug. 8, 2024

(30) Foreign Application Priority Data

Feb. 6, 2023 (CN) ........................ 202310110426.1

(51) Int. Cl.
*F21V 21/04* (2006.01)
*F21S 4/28* (2016.01)
(Continued)

(52) U.S. Cl.
CPC ............. *F21V 21/047* (2013.01); *F21S 4/28* (2016.01); *F21V 7/24* (2018.02); *F21V 13/04* (2013.01);
(Continued)

(58) Field of Classification Search
CPC ...... F21V 2200/20; F21V 21/047; F21V 7/24; F21V 13/04; F21V 17/12; F21V 19/003;
(Continued)

(56) References Cited

U.S. PATENT DOCUMENTS

2011/0080540 A1* 4/2011 Tomiyoshi ........... G02B 6/0083 349/62

FOREIGN PATENT DOCUMENTS

CN 202432365 U * 9/2012
CN 103411190 A * 11/2013
(Continued)

OTHER PUBLICATIONS

Search English translation CN-103411190-A (Year: 2013).*
(Continued)

*Primary Examiner* — Omar Rojas Cadima
(74) *Attorney, Agent, or Firm* — Schwegman Lundberg & Woessner, P.A.

(57) ABSTRACT

A side-emitting downlight with an integrated light bar is provided in this disclosure, which includes a face frame and a back plate. An annular projection is provided between the face frame and the back plate. The annular projection is provided with a notch, a first light bar is attacked to the inner peripheral wall of the annular projection, a second light bar is attacked to the outer peripheral wall of the annular projection and the first light bar and the second light bar are integrated and pass through the notch. In the side-emitting downlight with the integrated light bar according to the disclosure, with an uninterrupted integrated light bar, a function of inner-side and outer-side light emitting in two opposite directions can be realized, continuity and integrity of a circuit can be maintained, collocation of various color temperatures and simultaneous inner-side and outer-side light emitting can be realized.

17 Claims, 5 Drawing Sheets

(51) Int. Cl.

| | |
|---|---|
| ***F21V 7/24*** | (2018.01) |
| ***F21V 13/04*** | (2006.01) |
| ***F21V 17/12*** | (2006.01) |
| ***F21V 19/00*** | (2006.01) |
| *F21Y 103/10* | (2016.01) |
| *F21Y 103/33* | (2016.01) |
| *F21Y 115/10* | (2016.01) |

(52) U.S. Cl.
CPC ............ *F21V 17/12* (2013.01); *F21V 19/003* (2013.01); *F21V 2200/20* (2015.01); *F21Y 2103/10* (2016.08); *F21Y 2103/33* (2016.08); *F21Y 2115/10* (2016.08)

(58) Field of Classification Search
CPC ............. F21V 2200/00; F21V 2200/40; F21Y 2103/33; F21Y 2105/18; F21S 4/28; F21S 8/04; F21S 8/02; F21S 8/026; F21S 8/031; F21K 9/61; G02B 6/0046; G02B 6/0031
See application file for complete search history.

(56) References Cited

FOREIGN PATENT DOCUMENTS

| | | | | |
|---|---|---|---|---|
| JP | 2017069064 | A | * | 4/2017 |
| KR | 20110017648 | A | * | 2/2011 |

OTHER PUBLICATIONS

Search English translation CN-202432365-U (Year: 2012).*
Search English translation JP-2017069064-A (Year: 2017).*
Search English translation KR-20110017648-A (Year: 2011).*

* cited by examiner

SIDE-EMITTING DOWNLIGHT WITH INTEGRATED LIGHT BAR

CROSS REFERENCE TO THE RELATED APPLICATIONS

This Non-provisional application claims priority under 35 U.S.C. § 119(a) on Chinese Patent Application No(s). CN202310110426.1 filed on Feb. 6, 2023, the entire contents of which are hereby incorporated by reference.

TECHNICAL FIELD

The disclosure relates to the technical field of lighting fixtures, in particular to a side-emitting downlight with an integrated light bar.

BACKGROUND ART

A LED downlight is a kind of downward lighting fixture embedded in a ceiling, which is generally installed on a surrounding ceiling of a bedroom, a living room or a bathroom. Different light sources, light guide plates and diffusion plates can be used to achieve different light effects. Downlights do not occupy space, which can increase soft atmosphere of space. If a warm feeling is desired, more downlights can be installed to reduce oppressive sense of space.

At present, most of LED downlights on the market can only emit light from their front in consideration with a function of main lighting. In order to better create a space atmosphere feeling, a function of outside lighting is added on a basis of an original function of main lighting. At present, there are many forms and structures to realize the outside lighting, and in most of them, a flexible light bar is added to outside of a die-cast face frame, which cooperates with a diffusion cover for atomization to achieve effect of outer-race lighting. Disadvantages of similar design schemes are that in order to cooperate with installation of two flexible light boards and the diffusion cover, a whole kit of structural parts need new die sinking, with high design cost and an increased installation thickness, in which screws are needed for cooperation, which is not compatible with installation of a thick ceiling, and the two flexible light boards may results in difficulty in bonding wires and increased cost of input wires.

SUMMARY

1. Problems to be Solved

The disclosure aim to solve technical problems in related art, and provide a side-emitting downlight with an integrated light bar, which, with an uninterrupted integrated light bar, can realize a function of inner-side and outer-side light emitting in two opposite directions, maintain continuity and integrity of a circuit, realize collocation of various color temperatures, and realize simultaneous inner-side and outer-side light emitting.

2. Solution

To solve the above problems, the technical scheme provided in the disclosure is as follows.

A side-emitting downlight with an integrated light bar is provided, which includes a face frame and a back plate. An annular projection is provided between the face frame and the back plate, and a light-emitting cavity is provided between the face frame and the back plate. The light-emitting cavity includes a first light-emitting cavity arranged on an inner peripheral side of the annular projection and a second light-emitting cavity arranged on an outer peripheral side of the annular projection. The annular projection is provided with a notch, a first light bar is attacked to the inner peripheral wall of the annular projection, a second light bar is attacked to the outer peripheral wall of the annular projection and the first light bar and the second light bar are integrated and pass through the notch.

Alternatively, a diffusion plate, a light guide plate and a reflective paper are sequentially provided in the first light-emitting cavity, and the diffusion plate is arranged close to the face frame.

Alternatively, an EVA cotton layer is provided between the reflective paper and the back plate.

Alternatively, an annular limiting part is provided at an inner edge of the face frame, and the back plate is provided with an abutting projection, and the limiting part and the abutting projection are matched for pressing the diffusion plate, the light guide plate, the reflective paper and the EVA cotton layer together.

Alternatively, an inner edge of the limiting part is arranged opposite to the abutting projection.

Alternatively, a light guide ring is arranged in the second light-emitting cavity, and the light guide ring is arranged around outside of the second light bar.

Alternatively, an outer edge of the face frame is provided with a flanging folded upwards, and an outer peripheral wall of the light guide ring is abutted against an inner peripheral wall of the flanging.

Alternatively, an outer edge of the back plate is provided with a blocking rim, and the blocking rim is matched with the flanging for limiting the light guide ring.

Alternatively, a folded height of the flanging is not more than ⅓ of a height of the light guide ring, and the blocking rim does not completely cover a width of the light guide ring.

Alternatively, the face frame and the back plate are connected by a plurality of screws.

Alternatively, the face frame can be provided with an inner annular protrusion and an outer annular protrusion at the same time, and a connecting post is formed between the inner annular protrusion and the outer annular protrusion for clamping with the plurality of screws for fixation.

Alternatively, the inner annular protrusion and the outer annular protrusion are arranged in parallel and at intervals, and the inner annular protrusion and the outer annular protrusion are respectively provided with a first notch and a second notch, and the first notch and the second notch are staggered and misaligned in a circumferential direction. The light bar and the second light bar are electrically connected through a connecting section, and a length of the connecting section is adapted to a staggered distance of the first notch and the second notch in the circumferential direction.

Alternatively, a plurality of connecting posts are arranged at intervals to divide a gap between the inner annular protrusion and the outer annular protrusion into a plurality of groove units, and the first notch and the second notch are arranged relative to a same groove unit.

Alternatively, the annular projection is further provided with a mounting seat for mounting a spring fastener, and the mounting seat is provided with two mounting arms, both of which are bent to a middle and formed with a mounting opening, and the spring fastener is sleeved on the mounting seat through the mounting opening.

Alternatively, an anti-slip sheath made of a flexible material is further provided between the spring fastener and the mounting seat.

3. Beneficial Effects

Compared with the prior art, the technical schemes provided in the disclosure have the following beneficial effects:

In the side-emitting downlight with the integrated light bar, with an uninterrupted integrated light bar, a function of inner-side and outer-side light emitting in two opposite directions can be realized, continuity and integrity of a circuit can be maintained, collocation of various color temperatures and simultaneous inner-side and outer-side light emitting can be realized. Compared with two flexible light boards, a number of bonding wires and difficulty in bonding wires of one flexible light board are lower and cost of labor is lower.

1. Face frame; 2. Back Plate; 3. Annular protrusion; 4. Notch; 5. First Light Bar; 6. Second Light Bar; 7. Diffusion Plate; 8. Light Guide Plate; 9. Reflective Paper; 10. EVA Cotton Layer; 11. Abutting Projection; 12, Light Guide Ring; 13, Flanging; 14, Screw; 15. Limiting Part; 16. Blocking Rim; 17. Connecting Post; 18. Connecting Section; 19. Groove Unit; 20. Spring Fastener; 21. Mounting Seat; 22. Mounting Arm; 23. Mounting Opening; 24, Anti-slip Sheath; 25, Wire; 41, First Notch; 42. Second Notch.

DETAILED DESCRIPTION

In order to make the objects, technical schemes and advantages of the present invention more clear, the present invention will be further described in detail with reference to the drawings and specific embodiments. It should be understood that specific embodiments described herein are only for explaining the disclosure, and are not intended to limit the protection scope of the disclosure.

It should be noted that when an element is referred to as "fixed to", "disposed on", "fixed to" or "installed on" another element, it can be directly on another element or there can be an intervening element therebetween. When an element is referred to be "connected" to another element, it may be directly connected to the another element or an intervening element may exist at the same time. Further, when an element is regarded as "fixedly connected" to another element, these two elements can be fixed in a detachable connection mode or in a non-detachable connection mode, such as sleeving, clamping, integral molding and fixing, welding, etc., which can be realized in the related art, and are not described again here. When an element and another element are perpendicular or nearly perpendicular to each other, it means that they are perpendicular in an ideal state, but there may be some perpendicular errors due to influence of manufacturing and assembly. Terms "perpendicular", "horizontal", "left" and "right" and similar expressions used herein are for an illustration purposes only, and do not represent the only embodiment.

Unless otherwise defined, all technical and scientific terms used herein have same meaning as commonly understood by those skilled in the art of the present disclosure. Terminology used in description of the present disclosure herein is only for a purpose of describing specific embodiments, and is not intended to limit the present disclosure. As used herein, a term "and/or" includes any and all combinations of one or more related listed items.

Terms "first" and "second" in the present disclosure do not represent a specific number and order, but are only used to distinguish between names.

Figure 1:
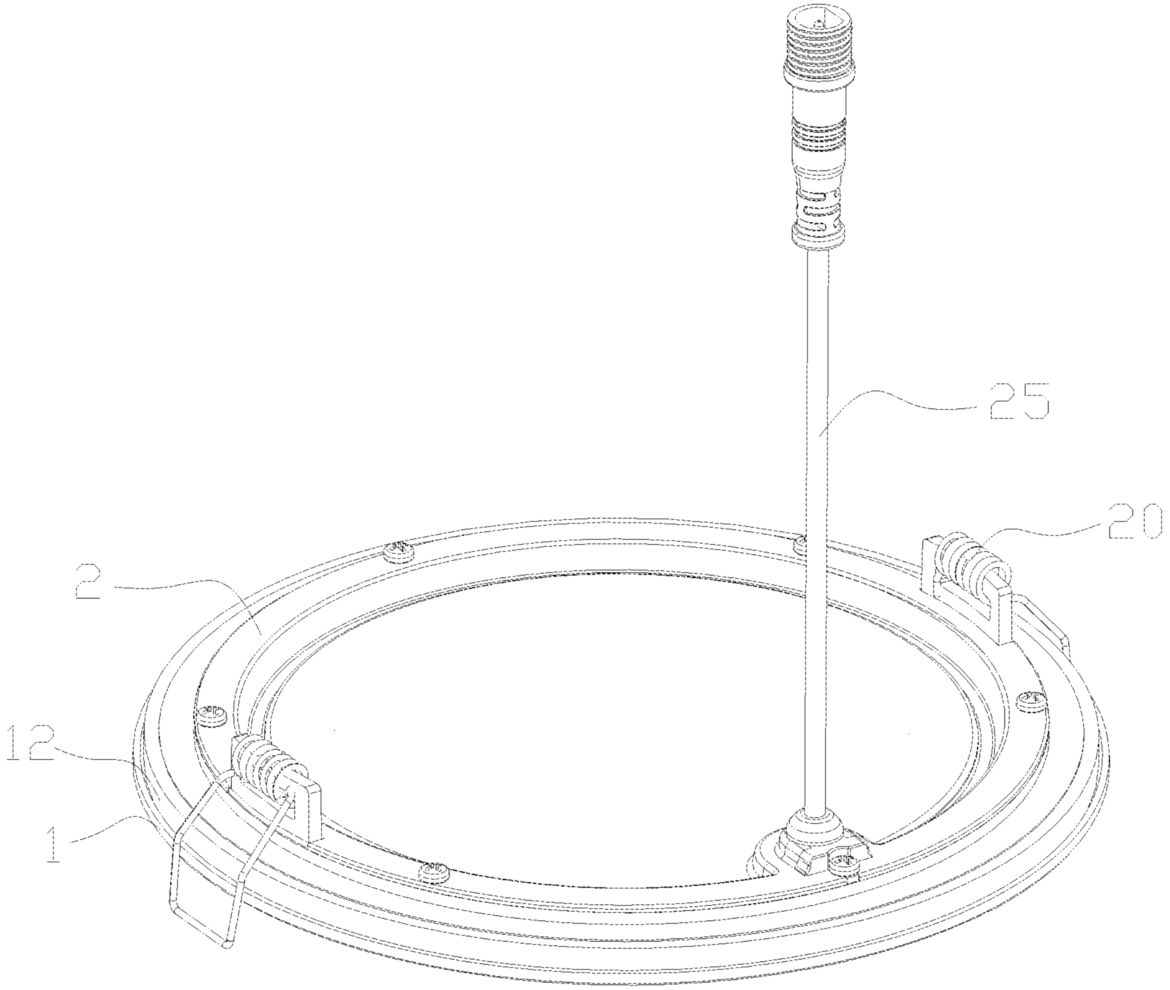
FIG. 1 is a schematic view of a back structure of a side-emitting downlight with an integrated light bar according to an embodiment of the present disclosure.
Figure 2:
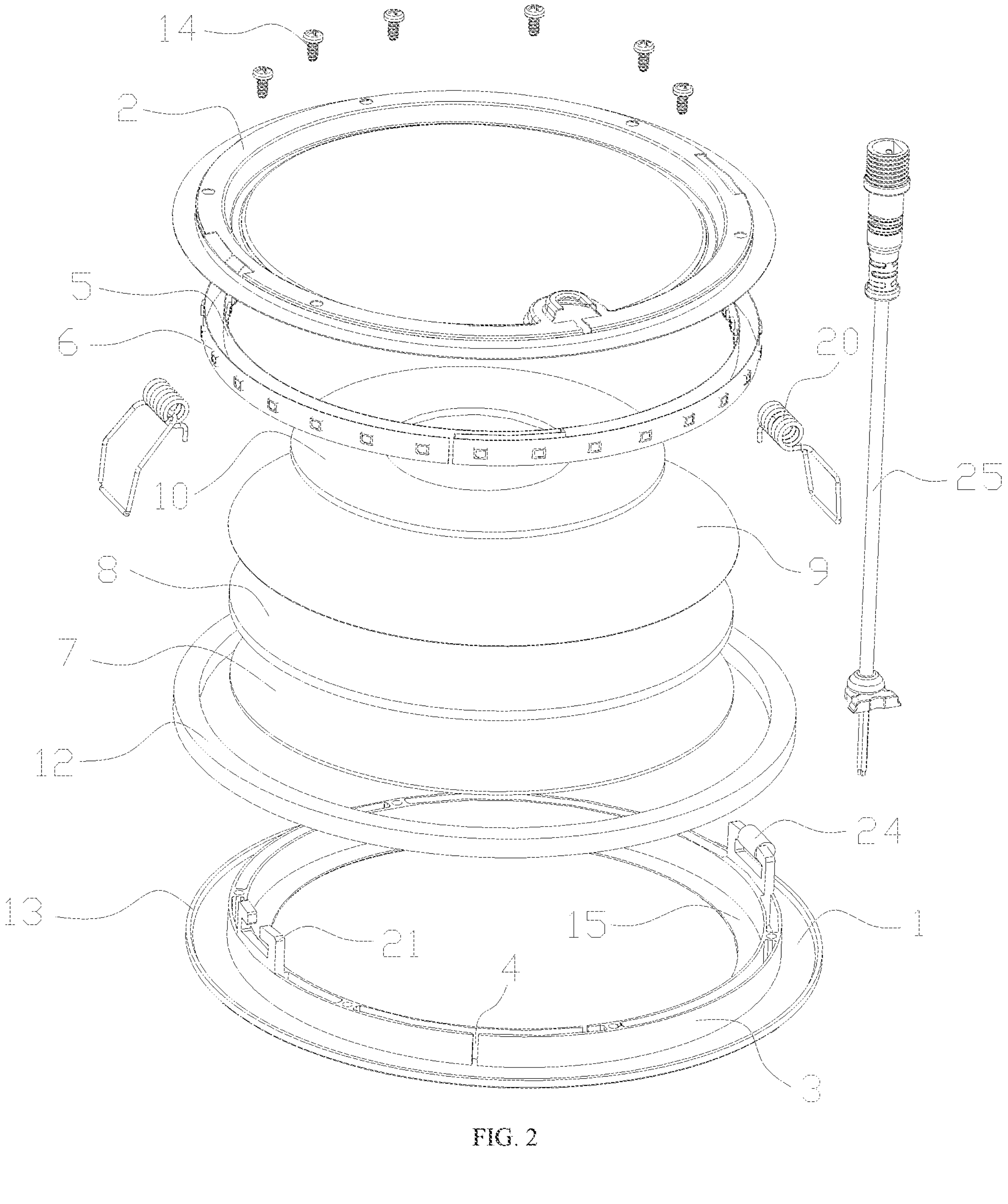
FIG. 2 is an exploded view of a side-emitting downlight with an integrated light bar according to the embodiment of the disclosure.
Figure 3:
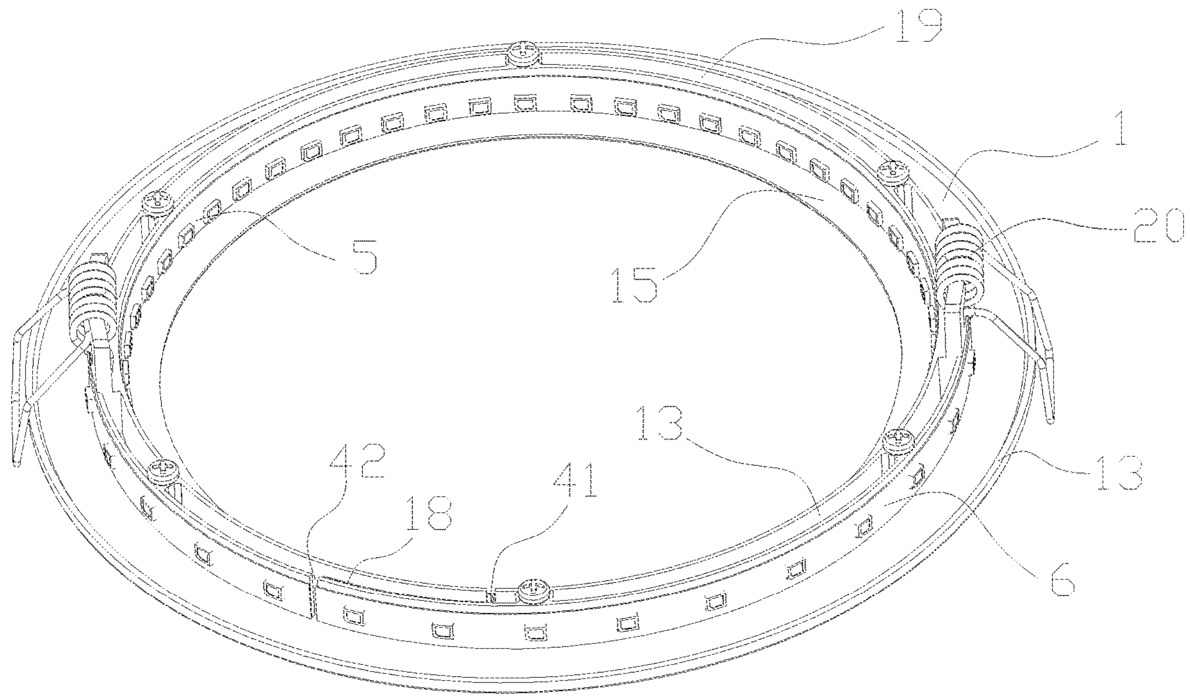
FIG. 3 is an internal schematic view of a part of a structure of a side-emitting downlight with an integrated light bar according to an embodiment of the present disclosure.

Referring to FIGS. 1 to 3, a side-emitting downlight with an integrated light bar in this embodiment includes a face frame 1 and a back plate 2. An annular projection 3 is provided between the face frame 1 and the back plate 2, the annular projection 3 is integrally die-cast with the face frame 1, and a light-emitting cavity is provided between the face frame 1 and the back plate 2. The light-emitting cavity includes a first light-emitting cavity arranged on an inner peripheral side of the annular projection 3 and a second light-emitting cavity arranged on an outer peripheral side of the annular projection 3, and a first light-emitting port adapted to the first light-emitting cavity is provided at a front face of the face frame 1. A second light-emitting port adapted to the second light-emitting cavity is provided at an edge of the face frame 1, the first light-emitting cavity and the second light-emitting cavity are separated by the annular projection 3, the annular projection 3 is provided with a notch 4, the first light-emitting cavity and the second light-emitting cavity are communicated through the notch 4, a first light bar 5 is attacked to an inner peripheral wall of the annular projection 3, the first light bar 5 is located in the first light-emitting cavity, a second light bar 6 is attached to an outer peripheral wall of the annular projection 3, and the second light bar 6 is located in the second light-emitting cavity. The first light bar 5 and the second light bar 6 can be an integrated light bar and pass through the notch 4, and the integrated light bar turns when it passes through the notch 4. With an uninterrupted integrated light bar, a function of inner-side and outer-side light emitting in two opposite directions can be realized, continuity and integrity of a circuit can be maintained, collocation of various color temperatures and simultaneous inner-side and outer-side light emitting can be realized. Compared with two flexible light boards, a number of bonding wires and difficulty in bonding wires of one flexible light board are lower and cost of labor is lower. The light bar 5 and the second light bar 6 are electrically connected with a power supply through wires 25.

Figure 7:
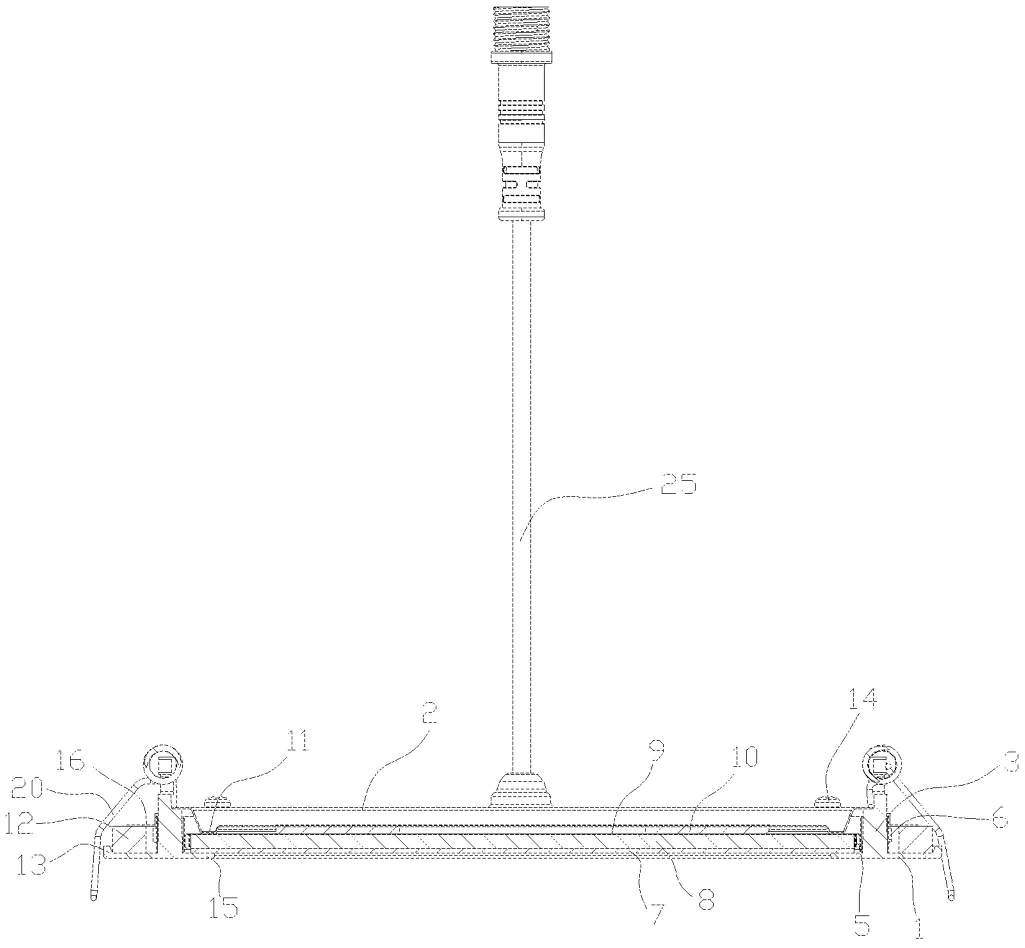
FIG. 7 is a schematic cross-sectional view of a side-emitting downlight with an integrated light bar according to an embodiment of the present disclosure.

Referring to FIGS. 2 and 7, as an alternative of the present disclosure, a diffusion plate 7, a light guide plate 8 and a reflective paper 9 are sequentially provided in the first light-emitting cavity. The diffusion plate 7 is arranged close to the face frame 1, and a thickness of the light guide plate 8 is not less than a width of the first light bar 5. An outer peripheral wall of the light guide plate 8 is arranged opposite to the first light bar 5 to ensure receiving of light emitted from the first light bar 5. The diffusion plate 7 is configured to soften light emitted from the front of the face frame 1, and the light guide plate 8 is configured to transmit light emitted from the first light bar 5 to the diffusion plate 7 so as to be emitted, and the reflective paper 9 is configured for ensuring lighting effect of the face frame 1.

Referring to FIG. 2 and FIG. 7, as an alternative of the present disclosure, an EVA cotton layer 10 is provided between the reflective paper 9 and the back plate 2. The EVA cotton layer 10 has advantages of good cushioning, shock resistance, heat insulation, moisture resistance, chemical corrosion resistance and the like, and is non-toxic and non-absorbent, which facilitates prolonging of service life of the downlight.

Referring to FIG. 2, FIG. 3, FIG. 5 and FIG. 6, as an alternative of the present disclosure, an annular limiting part 15 is provided at an inner edge of the face frame 1, and the back plate 2 is provided with an abutting projection 11. The limiting part 15 and the abutting projection 11 are matched for pressing the diffusion plate 7, the light guide plate 8, the reflective paper 9 and the EVA cotton layer 10 together. The abutting protrusion 11 is located at a side of the back plate 2 facing the EVA cotton layer 10, and is specifically an annular protrusion formed by integrally bending the back plate 2. The limiting part 15 and the face frame 1 are of an integrated structure. When the back plate 2 is installed on the face frame 1, the diffusion plate 7, the light guide plate 8, the reflective paper 9 and the EVA cotton layer 10 can be firmly pressed together by the abutting protrusions 11, so that all parts can be stably assembled together, and installation of parts in the first light-emitting cavity can be completed without using other connectors.

Referring to FIG. 7, specifically, an inner edge of the limiting part 15 is arranged opposite to the abutting projection 11, so that the diffusion plate 7, the light guide plate 8, the reflective paper 9 and the EVA cotton layer 10 which are pressed together are uniformly applied with a force, with a more stable structure.

The diffusion plate 7 is often configured to evenly distribute light on a surface to ensure that there are no over-bright or dark areas, which facilitates improving of uniformity of light and reduce glare. An operation principle of the diffusion plate 7 is to scatter light passing through the material, and this scattering is caused by microscopic irregularity of a surface of the light plate which results in reflection of light in many directions, resulting in a more diffused and uniform distribution of light on the surface.

The reflective paper 9, also known as an optical film, is of a material that can reflect light. The reflective paper 9 can reflect light from all directions back to its light source.

Referring to FIGS. 1 and 7, as an alternative of the present disclosure, a light guide ring 12 is arranged in the second light-emitting cavity, and the light guide ring 12 is arranged around outside of the second light bar 6. The light guide ring 12 is configured to receive light emitted by the second light bar 6 and make it uniformly emit from a side of the downlight, so as to ensure light uniformity when light is emitted from the side.

Referring to FIG. 2, both the light guide plate 9 and the light guide ring 12 are made of an optical grade acrylic/PC sheet material, and then light guide spots are printed on a bottom surface of the optical grade acrylic sheet material using a material with an extremely high refractive index and no light absorption. Light emitted from the downlight stays on a surface of and absorbed by the optical grade acrylic sheet material. When the light reaches respective light guide spots, reflected light may spread in respective angles, and then be emitted from a front of the light guide plate 9/light guide ring 12.

Referring to FIG. 2, FIG. 3, FIG. 5 and FIG. 7, as an alternative of the present disclosure, an outer edge of the face frame 1 is provided with a flanging 13 folded upwards, and the flanging 13 is bent toward a side of the back plate 2, and an outer peripheral wall of the light guide ring 12 is abutted against an inner peripheral wall of the flanging 13, so that the light guide ring 12 is fixed in combination with pressing action of the back plate 1, which greatly reduces structural complexity of the light guide ring 12; and if only the back plate 1 is pressed without provision of the flange 13, the light guide ring 12 is easily shake on a circumferential plane. In addition, design of the flanging 13 can also increase structural strength of an outer edge of the face frame 1.

Figure 6:
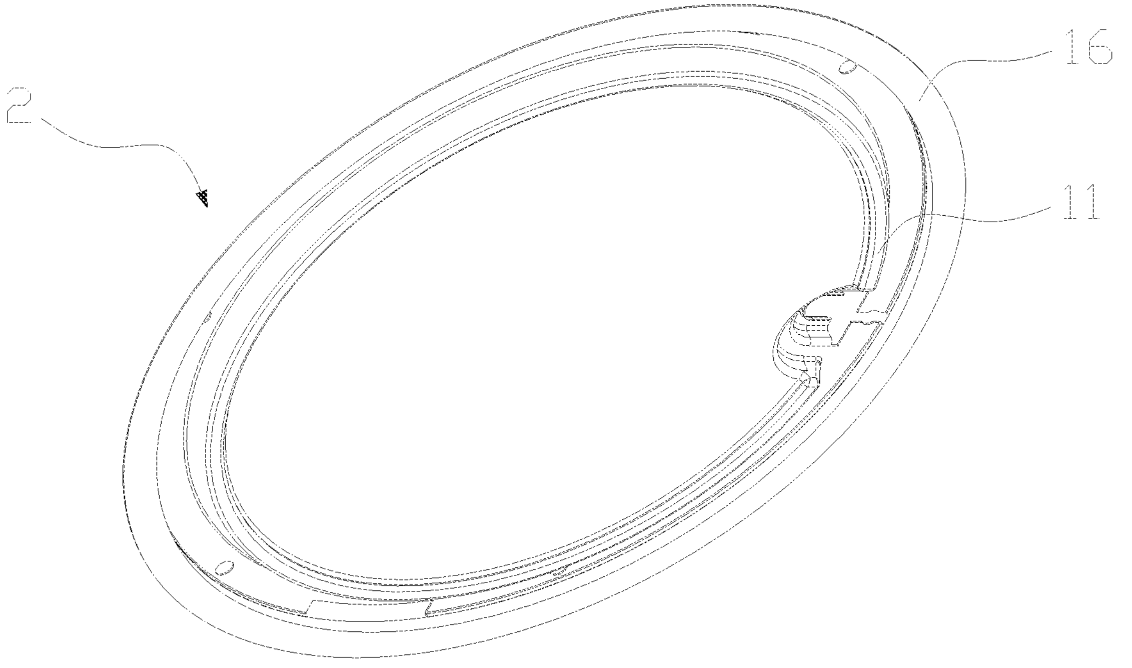
FIG. 6 is a schematic view of a bottom structure of a back plate of a side-emitting downlight with an integrated light bar according to an embodiment of the present disclosure.

Referring to FIGS. 6 and 7, specifically, an outer edge of the back plate 2 is provided with a blocking rim 16, and the blocking rim 16 is matched with the flanging 13 for limiting vertical traveling of the light guide ring 12 and preventing the light guide ring 12 from coming out.

A folded height of the flanging 13 is not more than ⅓ of a height of the light guide ring 12, and the blocking rim 16 does not completely cover a width of the light guide ring 12, so that the light guide ring 12 can have enough light-emitting space with stable installation between the face frame 1 and the back plate 2.

Referring to FIG. 1, FIG. 2 and FIG. 7, as an alternative of the present disclosure, the face frame 1 and the back plate 2 are connected by a plurality of screws 14. Specifically, the screws 14 pass through the back plate 2 and are connected with the annular protrusion 3, and there is no connection structure on the face frame 1 which is matched with the screws 14, so that the front face of the face frame 1 looks more beautiful.

As an alternative of the present disclosure, the face frame 1 can be provided with an inner annular protrusion 3 and an outer annular protrusion 3 at the same time, and a connecting post 17 is formed between the inner annular protrusion 3 and the outer annular protrusion 3 for clamping with the plurality of screws 14 for fixation, so that punching can be omitted and time and cost can be saved.

Figure 4:
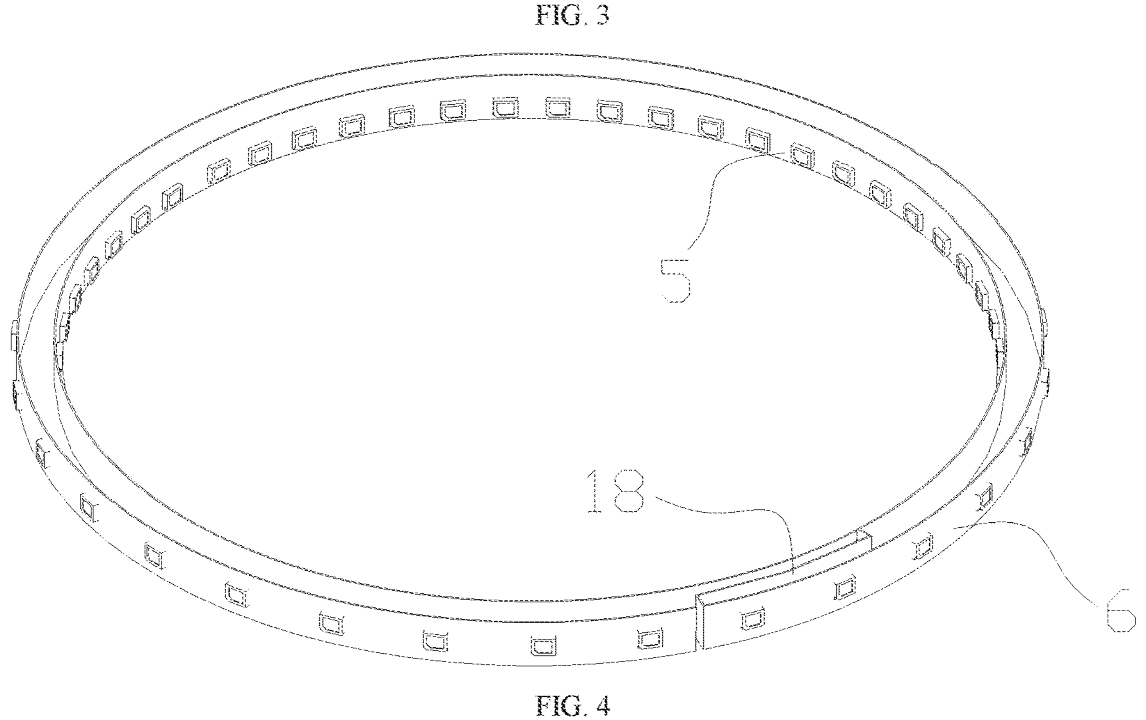
FIG. 4 is a schematic structural view of a light bar and a second light bar in a side-emitting downlight with an integrated light bar according to an embodiment of the present disclosure.
Figure 5:
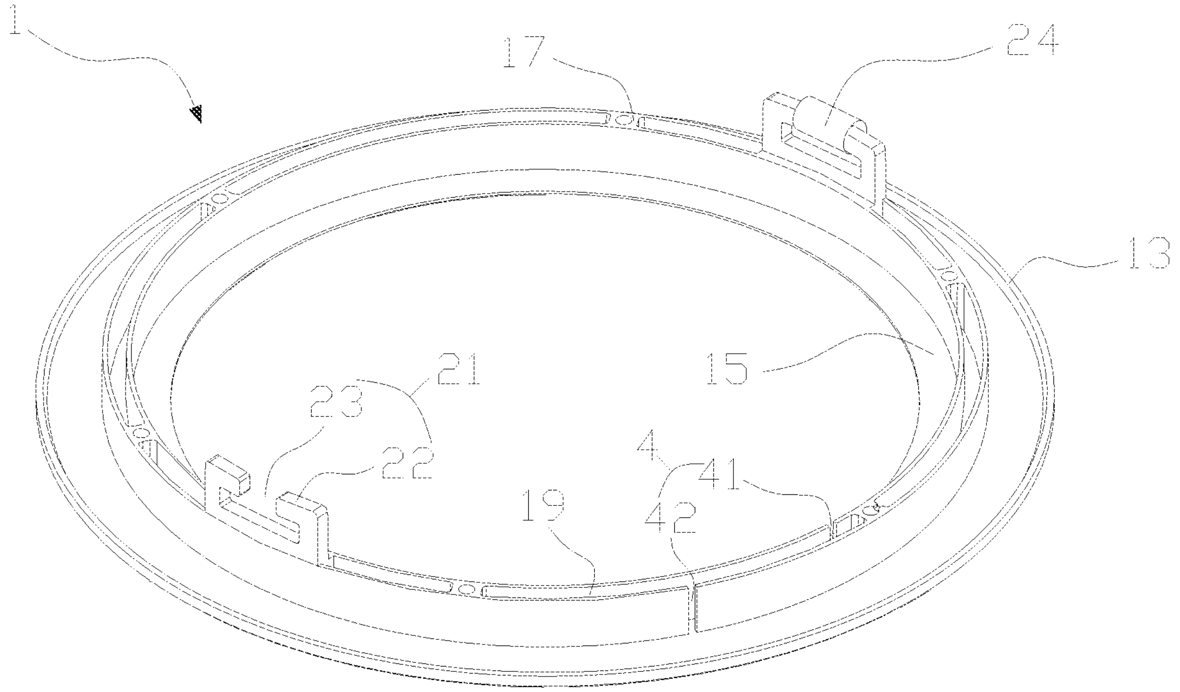
FIG. 5 is a schematic structural view of a face frame of a side-emitting downlight with an integrated light bar according to an embodiment of the present disclosure.

Referring to FIGS. 3 to 5, as an alternative of the present disclosure, the inner annular protrusion 3 and the outer annular protrusion 3 are arranged in parallel and at intervals, and the inner annular protrusion 3 and the outer annular protrusion 3 are respectively provided with a first notch 41 and a second notch 42, and the first notch 41 and the second notch 42 are staggered and misaligned in a circumferential direction. The light bar 5 and the second light bar 6 are electrically connected through a connecting section 18, and a length of the connecting section 18 is adapted to a staggered distance of the first notch 41 and the second notch 42 in the circumferential direction.

The face frame 1 and the inner annular protrusion 3 and the outer annular protrusion 3 are made of an opaque material, and the first notch 41 and the second notch 42 are staggered with each other, so that the light bar 5 and the second light bar 6 respectively arranged on an inner peripheral wall and an outer peripheral wall of the two annular protrusions 3 do not interfere with each other when emitting light, thus avoiding light leakage.

Referring to FIG. 5, as an alternative of the present disclosure, a plurality of connecting posts 17 are arranged at intervals to divide a gap between the two annular protrusions 3 into a plurality of groove units 19. When the light bar 5 and the second light bar 6 emit light, heat may be generated, and the gap between the two annular protrusions 3 facilitates heat dissipation. The first notch 41 and the second notch 42 are arranged relative to a same groove unit 19. A staggered distance of the first notch 41 and the second notch 42 in the circumferential direction is not greater than a length of the groove unit 19, and a length of the connecting section 18 is appropriate, which reduces use of materials.

Referring to FIG. 5, as an alternative of the present disclosure, the annular projection 3 is further provided with a mounting seat 21 for mounting a spring fastener 20, and the mounting seat 21 is provided with two mounting arms 22, both of which are bent to a middle and formed with a mounting opening 23, and the spring fastener 20 is sleeved on the mounting seat 21 through the mounting opening 23, which facilitates convenient and rapid disassembly and assembly of the spring fastener 20.

Referring to FIG. 5, as an alternative of the present disclosure, an anti-slip sheath 24 made of a flexible material is further provided between the spring fastener 20 and the mounting seat 21. The anti-skid sheath 24 has a short tubular structure, and is sleeved on the two bent mounting arms 22, and the spring fastener 20 is sleeved outside the anti-skid sheath 24. The non-slip sheath 24 can be made of a flexible material such as silica gel and rubber.

The present disclosure and embodiments thereof are described above in an illustrative manner, which is not restrictive; and what is shown in the drawings is only one of the embodiments of the present disclosure, and its actual structure is not limited thereto. Therefore, structures and embodiments similar to the technical scheme designed by those of ordinary skilled in the art inspired by this disclosure without creativity, without departing from the creative purpose of the present disclosure, are all within a protection scope of the present disclosure.

What is claimed is:

1. A side-emitting downlight with an integrated light bar, the side-emitting downlight comprising: a face frame and a back plate, wherein an annular projection is provided between the face frame and the back plate, and a light-emitting cavity is provided between the face frame and the back plate; the light-emitting cavity comprises a first light-emitting cavity arranged on an inner peripheral side of the annular projection and a second light-emitting cavity arranged on an outer peripheral side of the annular projection; and the annular projection is provided with a notch, a first light bar is attached to the inner peripheral wall of the annular projection, a second light bar is attached to the outer peripheral wall of the annular projection and the first light bar and the second light bar are integrated and pass through the notch;

wherein a light guide ring is arranged in the second light-emitting cavity, and the light guide ring is arranged around outside of the second light bar;

wherein an outer edge of the face frame is provided with a flanging folded upwards, and an outer peripheral wall of the light guide ring is abutted against an inner peripheral wall of the flanging.

2. The side-emitting downlight with the integrated light bar according to claim 1, wherein a diffusion plate, a light guide plate and a reflective paper are sequentially provided in the first light-emitting cavity, the diffusion plate being arranged close to the face frame.

3. The side-emitting downlight with the integrated light bar according to claim 2, wherein an EVA cotton layer is provided between the reflective paper and the back plate.

4. The side-emitting downlight with the integrated light bar according to claim 3, wherein an annular limiting part is provided at an inner edge of the face frame, and the back plate is provided with an abutting projection, and the limiting part and the abutting projection are matched for pressing the diffusion plate, the light guide plate, the reflective paper and the EVA cotton layer together.

5. The side-emitting downlight with the integrated light bar according to claim 4, wherein an inner edge of the limiting part is arranged opposite to the abutting projection.

6. The side-emitting downlight with the integrated light bar according to claim 1, wherein the face frame and the back plate are connected by a plurality of screws.

7. The side-emitting downlight with the integrated light bar according to claim 6, wherein the face frame is provided with an inner annular protrusion and an outer annular protrusion at the same time, and a connecting post is formed between the inner annular protrusion and the outer annular protrusion for clamping with the plurality of screws for fixation.

8. The side-emitting downlight with the integrated light bar according to claim 7, wherein the inner annular protrusion and the outer annular protrusion are arranged in parallel and at intervals, and the inner annular protrusion and the outer annular protrusion are respectively provided with a first notch and a second notch, the first notch and the second notch being staggered and misaligned in a circumferential direction; and the light bar and the second light bar are electrically connected through a connecting section, a length of the connecting section being adapted to a staggered distance of the first notch and the second notch in the circumferential direction.

9. The side-emitting downlight with the integrated light bar according to claim 8, wherein a plurality of connecting posts are arranged at intervals to divide a gap between the inner annular protrusion and the outer annular protrusion into a plurality of groove units, and the first notch and the second notch are arranged relative to a same groove unit.

10. The side-emitting downlight with the integrated light bar according to claim 1, wherein the annular projection is further provided with a mounting seat for mounting a spring fastener, and the mounting seat is provided with two mounting arms, both of which are bent to a middle and formed with a mounting opening, and the spring fastener is sleeved on the mounting seat through the mounting opening.

11. The side-emitting downlight with the integrated light bar according to claim 10, wherein an anti-slip sheath made of a flexible material is further provided between the spring fastener and the mounting seat.

12. A side-emitting downlight with an integrated light bar, the side-emitting downlight comprising: a face frame and a back plate, wherein an annular projection is provided between the face frame and the back plate, and a light-emitting cavity is provided between the face frame and the back plate; the light-emitting cavity comprises a first light-emitting cavity arranged on an inner peripheral side of the annular projection and a second light-emitting cavity arranged on an outer peripheral side of the annular projection; and the annular projection is provided with a notch, a first light bar is attached to the inner peripheral wall of the annular projection, a second light bar is attached to the outer peripheral wall of the annular projection and the first light bar and the second light bar are integrated and pass through the notch;

wherein a diffusion plate, a light guide plate and a reflective paper are sequentially provided in the first light-emitting cavity, the diffusion plate being arranged close to the face frame;

wherein an EVA cotton layer is provided between the reflective paper and the back plate;

wherein an annular limiting part is provided at an inner edge of the face frame, and the back plate is provided with an abutting projection, and the limiting part and the abutting projection are matched for pressing the diffusion plate, the light guide plate, the reflective paper and the EVA cotton layer together.

13. The side-emitting downlight with the integrated light bar according to claim 12, wherein a light guide ring is arranged in the second light-emitting cavity, and the light guide ring is arranged around outside of the second light bar.

14. The side-emitting downlight with the integrated light bar according to claim 13, wherein an outer edge of the face frame is provided with a flanging folded upwards, and an outer peripheral wall of the light guide ring is abutted against an inner peripheral wall of the flanging.

15. The side-emitting downlight with the integrated light bar according to claim 14, wherein an outer edge of the back plate is provided with a blocking rim, the blocking rim being matched with the flanging for limiting the light guide ring.

16. The side-emitting downlight with the integrated light bar according to claim 15, wherein a folded height of the flanging is not more than ⅓ of a height of the light guide ring, and the blocking rim does not completely cover a width of the light guide ring.

17. A side-emitting downlight with an integrated light bar, the side-emitting downlight comprising: a face frame and a back plate, wherein an annular projection is provided between the face frame and the back plate, and a light-emitting cavity is provided between the face frame and the back plate; the light-emitting cavity comprises a first light-emitting cavity arranged on an inner peripheral side of the annular projection and a second light-emitting cavity arranged on an outer peripheral side of the annular projection; and the annular projection is provided with a notch, a first light bar is attached to the inner peripheral wall of the annular projection, a second light bar is attached to the outer peripheral wall of the annular projection and the first light bar and the second light bar are integrated and pass through the notch;

wherein the face frame and the back plate are connected by a plurality of screws;

wherein the face frame is provided with an inner annular protrusion and an outer annular protrusion at the same time, and a connecting post is formed between the inner annular protrusion and the outer annular protrusion for clamping with the plurality of screws for fixation.

* * * * *